United States Patent
Doyle et al.

(10) Patent No.: US 7,308,488 B2
(45) Date of Patent: Dec. 11, 2007

(54) METHOD, SYSTEM AND PROGRAM PRODUCTS FOR DISTRIBUTING PORTAL CONTENT PROCESSING

(75) Inventors: Ronald P. Doyle, Raleigh, NC (US);
John G. Dudley, Raleigh, NC (US);
James C. Fletcher, Apex, NC (US);
James R. Giles, Yorktown Heights, NY (US); Steven D. Ims, Apex, NC (US);
Zon-Yin Shae, South Salem, NY (US);
Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 10/242,130

(22) Filed: Sep. 12, 2002

(65) Prior Publication Data
US 2004/0054749 A1    Mar. 18, 2004

(51) Int. Cl.
*G06F 15/16* (2006.01)
*G06F 3/00* (2006.01)

(52) U.S. Cl. ............... 709/219; 715/530; 715/513; 715/500; 715/742; 707/100; 707/101; 707/3; 712/44; 712/45; 712/46; 712/34; 712/35; 712/36

(58) Field of Classification Search .............. 725/45, 725/46, 44, 34, 35, 36; 715/530, 513, 500, 715/742; 707/100, 101, 3
See application file for complete search history.

(56) References Cited

U.S. PATENT DOCUMENTS
6,976,210 B1 * 12/2005 Silva et al. .............. 715/513

OTHER PUBLICATIONS
Twaddle, Graham K, WO 02/19162 A2, Method and System for Dynamic Web-Page Generation, and Computer-Readable Storage,, Mar. 7, 2002, WIPO.*

* cited by examiner

*Primary Examiner*—Nathan Flynn
*Assistant Examiner*—Ashok Patel
(74) *Attorney, Agent, or Firm*—Jeanine S. Ray-Yarletts; Hoffman, Warnick & D'Alessandro LLC

(57) ABSTRACT

The present invention generally relates to a method, system and program product for distributing portal content processing. Specifically, a request for portal content is received on a surrogate system and then passed to a portal system. The portal system will obtain and aggregate a first type of the requested content, and then package the aggregated content into a response. The response will also include place holders that correspond to the remaining type of the requested content. The response will then be transmitted to the surrogate system, which will, based upon the place holders, obtain the remaining type of portal content. Once obtained, the remaining type of portal content will replace the place holders in the response, and the response will be rendered for the requesting portal user.

37 Claims, 5 Drawing Sheets

METHOD, SYSTEM AND PROGRAM PRODUCTS FOR DISTRIBUTING PORTAL CONTENT PROCESSING

BACKGROUND OF THE INVENTION

1. Field of the Invention

The present invention generally relates to a method, system and program product for distributing portal content processing. Specifically, the present invention improves responsiveness and scalability of portal solutions by sharing portlet processing duties between a portal system and a surrogate system.

2. Background Art

Web portals have become an increasingly popular means of delivering aggregated, personalized content to computer users. Typically, a portal server includes a portal program (e.g., WebSphere Portal Server from International Business Machines Corp. of Armonk, N.Y.), which obtains and aggregates portal content into a portal page. The portal page includes sections or visual portlets that each contain particular portal content formatted according to a user's preferences. For example, a user could establish his/her own portal page that has sections for news, weather and sports. When the page is requested, the portal program would obtain the desired portal content from the appropriate content providers. Once obtained, the portal content would be aggregated, and then displayed in the appropriate sections as a portal web page. This portal technology has lead to the explosion of personalized "home" pages for individual web users.

To date, the aggregation of portal content has been occurring at a single point, namely, on the portal server. For each type of content the user wishes to receive, a separate portlet could be provided (e.g., a news portlet, a sports portlet, a weather portlet, etc.) to obtain the corresponding portal content from the appropriate content provider. Once obtained, the portal program must aggregate all of the content into a single Web page. Since such aggregation occurs on the portal server at a single point in time, bottlenecking is often experienced. This bottlenecking often leads to increased (poorer) response time and reduced scalability.

Heretofore, attempts have been made to address the efficiency by which portal content is delivered. None of such attempts, however, improve efficiency by distributing portlet aggregation. Rather, the previous attempts generally revolve around remote portlet invocation. Specifically, under a standard called Web Services for Remote Portals (WSRP), portlets can be off-loaded from the portal server to other systems. This allows the portal content to be produced by multiple systems instead of only by the portal server. However, while preventing potential congestion in producing the portal content, this fails to alleviate aggregation bottlenecking.

In view of the foregoing, there exists a need for a method, system and program product for distributing portal content processing. Specifically, a need exists for a method, system and program product that can distribute both the retrieval/generation and the aggregation of portal content. A further need exists for portal content processing duties to be shared between multiple systems to improve scalability and reduce network latency.

SUMMARY OF THE INVENTION

In general, the present invention provides a method, system and program product for distributing portal content processing. Specifically, a surrogate system is provided between a web user and a portal system. All requests for portal content are first received by the surrogate system and then passed to the portal system. Under the present invention, the requested portal content is classified into two (or more) types. The portal system is responsible for obtaining and aggregating portal contents of the first type. The portal system then forms an intermediate response consisting of the first-type of content and place holders for the second type of content. This response will be transmitted to the surrogate system, which will, based upon the place holders, obtain the missing second type of portal contents. The place holders in the response will then be replaced with the retrieved second-type portal content, and the aggregated response, containing both content types, will be returned as a portal page for the requesting portal user.

According to a first aspect of the present invention, a method for distributing portal content processing is provided. The method comprises: (1) receiving a request for portal content on a surrogate system, wherein the requested portal content has a first type and a second type; (2) forwarding the request to a portal system; (3) receiving a response from the portal system, wherein the response includes the first type of portal content and place holders corresponding to the second type of portal content; and (4) obtaining the second type of portal content on the surrogate system, and replacing the place holders in the response with the second type of portal content.

According to a second aspect of the present invention, a method for distributing portal content processing is provided. The method comprises: (1) receiving a request for a first type of portal content and a second type of portal content on a surrogate system, and forwarding the received request to a portal system; (2) obtaining and aggregating the first type of portal content and providing place holders corresponding to the second type of portal content, on the portal system; (3) transmitting a response containing the aggregated first type of portal content and the place holders from the portal system to the surrogate system; and (4) obtaining the second type of portal content on the surrogate system, and replacing the place holders in the response with the second type of portal content.

According to a third aspect of the present invention, a method for distributing portal content processing is provided. The method comprises: (1) receiving a request for a first type of portal content and a second type of portal content on a portal system; (2) obtaining and aggregating the first type of portal content on the portal system; and (3) transmitting a response containing the aggregated first type of portal content and place holders corresponding to the second type of portal content from the portal system.

According to a fourth aspect of the present invention, a method for distributing portal content processing is provided. The method comprises: (1) receiving a request for portal content on a surrogate system, wherein the requested portal content has a first type and a second type; (2) forwarding the request to a portal system; (3) receiving a response from the portal system, wherein the response includes the first type of portal content; and (4) obtaining the second type of portal content on the surrogate system from a content provider.

According to a fifth aspect of the present invention, a system for distributing portal content processing is provided.

The system comprises: (1) a request system for receiving a request for a first type of portal content and a second type of portal content, and for forwarding the request to a portal system; (2) a response system for receiving a response containing the first type of portal content and place holders corresponding to the second type of portal content, from the portal system; (3) an external content system for obtaining the second type of portal content; and (4) a replacement system for replacing the place holders in the response with the second type of portal content.

According to a sixth aspect of the present invention, a system for distributing portal content processing is provided. The system comprises: (1) a surrogate system for receiving a request for portal content, wherein the requested portal content includes a first type and a second type; (2) a portal system for receiving the request from the surrogate system, wherein the portal system receives and aggregates the first type of portal content and provides place holders corresponding to the second type of portal content, and wherein the portal system transmits the aggregated first type of portal content and the place holders to the surrogate system as a response; and (3) wherein the surrogate system obtains the second type of portal content, and replaces the place holders with the second type of portal content.

According to a seventh aspect of the present invention, a program product stored on a recordable medium for distributing portal content processing is provided. When executed, the program product comprises: (1) program code for receiving a request for a first type of portal content and a second type of portal content, and for forwarding the request to a portal system; (2) program code for receiving a response containing the first type of portal content and place holders corresponding to the second type of portal content, from the portal system; (3) program code for obtaining the second type of portal content; and (4) program code for replacing the place holders in the response with the second type of portal content.

Therefore, the present invention provides a method, system and program product for distributing portlet aggregation.

BRIEF DESCRIPTION OF THE DRAWINGS

These and other features of this invention will be more readily understood from the following detailed description of the various aspects of the invention taken in conjunction with the accompanying drawings in which.

Figure 1:
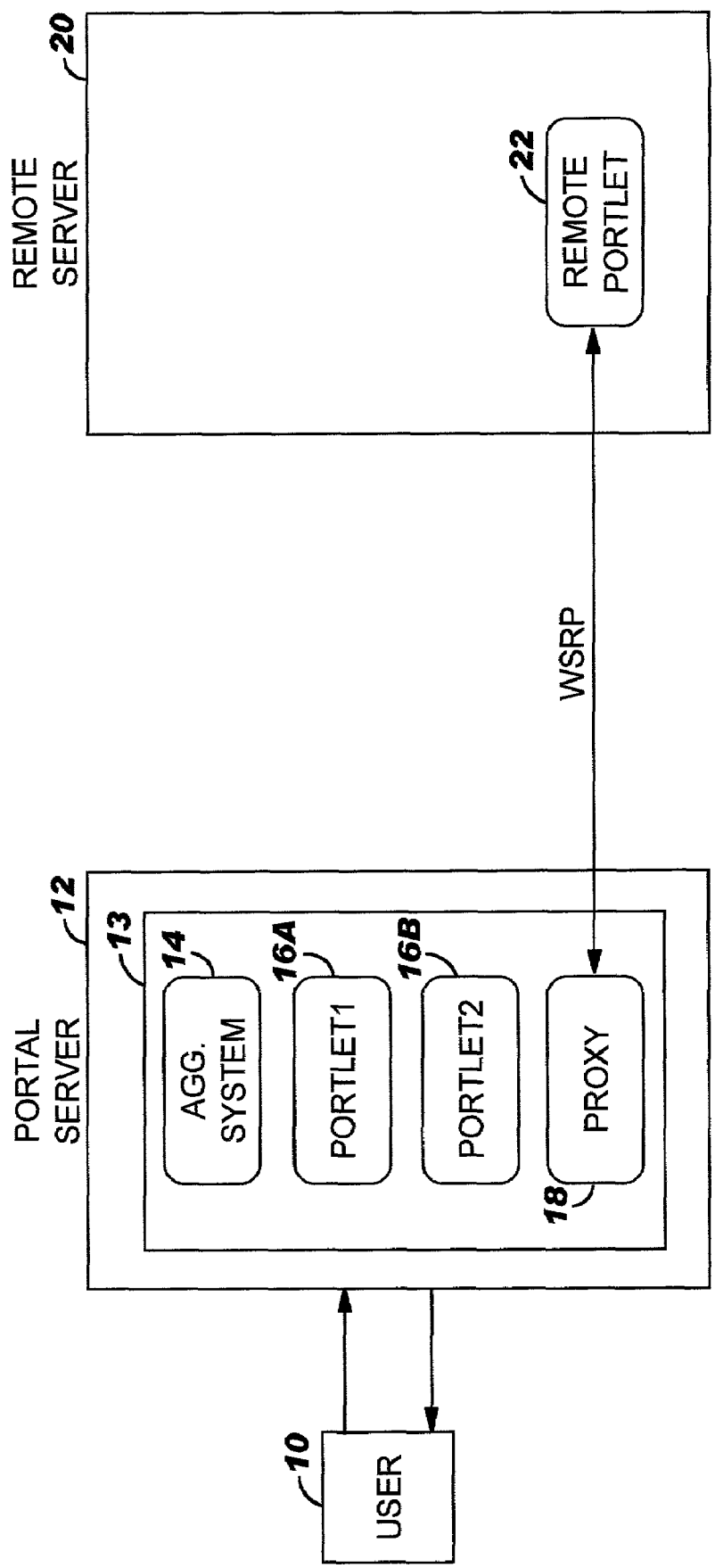
FIG. 1 depicts a related art system for invoking remote portlets.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method, system and program product for distributing portal content processing. Specifically, one or more surrogate systems are provided between a web user and a portal system. All requests for portal content are first received by the surrogate system(s) and then passed to the portal system. Under the present invention, the requested portal content is classified into two (or more) portions/types. The portal system is responsible for obtaining the first type of requested portal content. Once obtained, the first type is aggregated and packaged into a response that includes place holders corresponding to the second type of portal content. The response will be transmitted to the surrogate system, which will, based upon the place holders, invoke portlets (either locally or on one or more remote systems) to obtain the missing second type of portal content. Once obtained, the second type of portal content is used to replace the place holders in the response. Then, the response containing both content types will be rendered as a portal page for the requesting portal user.

Referring now to, FIG. 1, a related art system for remote portlet invocation is shown. As depicted, the related art system includes portal server 12 and remote server 20. Portal server 12 includes portal program 13 (e.g., WebSphere Portal Server), which itself can include, among other things, aggregation system 14, portlets 16A-B and proxy 18. When user 10 makes a request for portal content, portal program 13 will receive the request and invoke portlets 16A-B and proxy 18 to retrieve the requested content. Specifically, portlets 16A-B will generate particular types of portal content while proxy 18 causes remote portlet 22 to generate other portal content. The content generated by remote portlet 22 will then be transmitted to portal server 12. Once all of the requested portal content has been obtained, it will be aggregated via aggregation system 14 and displayed to user 10 as a portal page. As indicated above, although the system depicted in FIG. 1 allows for the generation of portal content to be distributed, it fails to distribute the aggregation of the portal content. Under such a system, aggregation bottlenecking will still occur.

It should be understood that although portal program 13 is shown as including aggregation system 14, portlets 16A-B and proxy 18, this may or may not be the case. For example, portlets 16A-B and/or proxy 18 could exist outside of portal program 12 and merely work in conjunction therewith.

Figure 2:
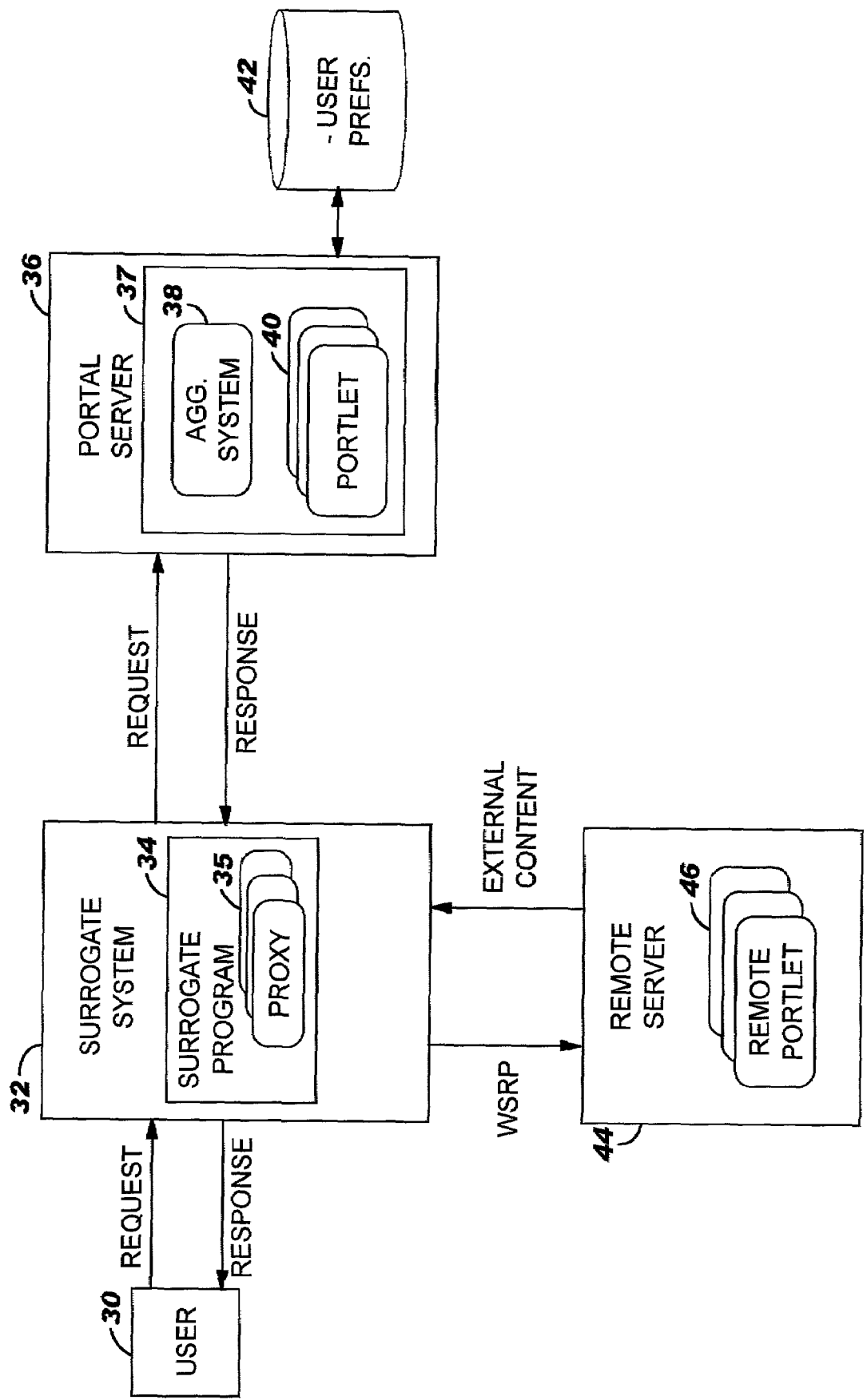
FIG. 2 depicts a system for distributing portlet aggregation, according to the present invention.

Referring now to FIG. 2, a system for distributing portal content processing according to the present invention is shown. The present invention overcomes the drawbacks associated with the system of FIG. 1 by, among other things, distributing both the obtaining/production and aggregation of portal content. In general, the system generally includes one or more surrogate system(s) 32 each having surrogate program 34, portal server/system 36 having portal program 37 and one or more remote system(s) 44 each having remote portlet(s) 46. Under the present invention, surrogate system 32 and portal system 36 are programmed to obtain and aggregate different portions/types of requested portal content. In one embodiment, portal system 36 is programmed to obtain only "internal" portal content (i.e., portal content that is generated by portlets within the network of portal system 36), while surrogate system 32 is programmed to obtain and aggregate only "external" portal content (i.e., portal content that is generated by portlets outside of the network of portal system 36). For example, if user 30 had established a personalized home page on IBM.com, and the personalized home page had sections (portlets) for: (1) IBM-based technical content; and (2) AP-News, portal system 36 would be responsible for obtaining and aggregating the IBM-based content while surrogate system 32 would be responsible for obtaining and aggregating the news from the AP.

To this extent, a request for portal content by user 30 is first received by surrogate system 32, which will optionally attach a header and forward the request to portal system 36. If attached, the header informs portal system 36 of the existence and the capabilities of surrogate system 32. When the request is passed to portal system 36, a first type of portal content (e.g., internal) will be generated by portlets 40 (or by other remote portlets invoked by portal system 36). In addition, any user preferences can be retrieved from log 42. In a typical embodiment, only those portlets 40 that are capable of generating the first type of portal content (e.g., internal) are loaded on, or are accessible/invoked by portal system 36. Once the first type of portal content has been obtained, it is aggregated and packaged into a response by aggregation system 38. The response also includes place holders that correspond to the requested second type of portal content (e.g., external). Specifically, the place holders include information necessary to invoke remote portlet(s) 46. Once the response has been prepared, it is transmitted to surrogate system 32 (e.g., also via aggregation system 38).

Upon reception of the response by surrogate system 32, one or more proxies within surrogate program 34 will, based upon the place holders, invoke remote portlets 46 on remote system(s) 44 (e.g., content providers) to obtain the missing second type of portal content (e.g., external). Typically, invocation of remote portlets 46 is accomplished as described above in conjunction with FIG. 1. That is, one or more WSRP requests are sent to remote portlets 46 loaded on one or more remote systems 44 from proxies 35. In response to the WSRP request(s), remote portlets 46 generate the requested second type of portal content. Once generated, the second type of portal content is transmitted back to surrogate system 32. Upon receipt, surrogate program 34 will replace the place holders in the response with the second type of portal content (i.e., aggregate the response). The response, now having the first and second types of portal content can then be transmitted to user 30 for display as a portal page according to any user preferences stored in log 42. Thus, the present invention distributes both the obtaining and the aggregation of requested portal content among two different systems (i.e., portal system 36 and surrogate system 32). This not only reduces network latency associated with aggregation bottlenecking, but also improves scalability. It should be appreciated that although the functions of: (1) aggregating internal portal content; (2) packing the aggregated internal portal content into a response along with place holders that correspond to external portal content; and (3) transmitting the response to surrogate system 32 are described as being performed by aggregation system 38, many variations are possible. For example, separate systems could exist within portal program 37 to perform each of these functions. The embodiment depicted herein is only intended to be illustrative.

It should also be understood that as described above, portal system 36 typically generates and aggregates a first type of portal content (e.g., internal), while surrogate system 32 obtains and aggregates a second type of portal content (e.g., external). To this extent, classification could be an informal function that is accomplished simply by loading only certain "internal" portlets on portal system 36, and proxies that call external remote portlets on surrogate system 32. Alternatively, portal system 36 could also call other remote portlets (not shown) that are capable of generating only the first type of content. It should be also appreciated, however, that the teachings of the present invention are not intended to be limited to classifying the requested portal content as either internal or external and that many variations could be implemented hereunder. It should also be appreciated that remote system 44 and surrogate system 32 can represent the same system, and that any remote portlets invoked hereunder can be invoked using WSRP or any other applicable protocol. In addition, it should be appreciated that the portlets invoked by surrogate system 32 hereunder need not be loaded on remote system 44. Rather, remote portlets 46 could be loaded within surrogate system 32. Along these lines, it should be understood that the type of content obtained by surrogate system 32 could be obtained in any known manner. For example, surrogate system 32 could obtain the second type of content by communicating with one or more local storage systems (e.g., databases). Thus, in the case of a supermarket chain, surrogate systems 32 could be implemented at the individual stores while portal system 36 is implemented at the chain's national headquarters. In such an embodiment, portal system 36 could be responsible for obtaining content that is common to all stores in the chain (e.g., store locations) while surrogate system 32 is responsible for obtaining content that could vary from store to store (e.g., prices). In this case, each surrogate system 32 would communicate with a local storage system at the particular store to obtain the "local" content.

Figure 3:
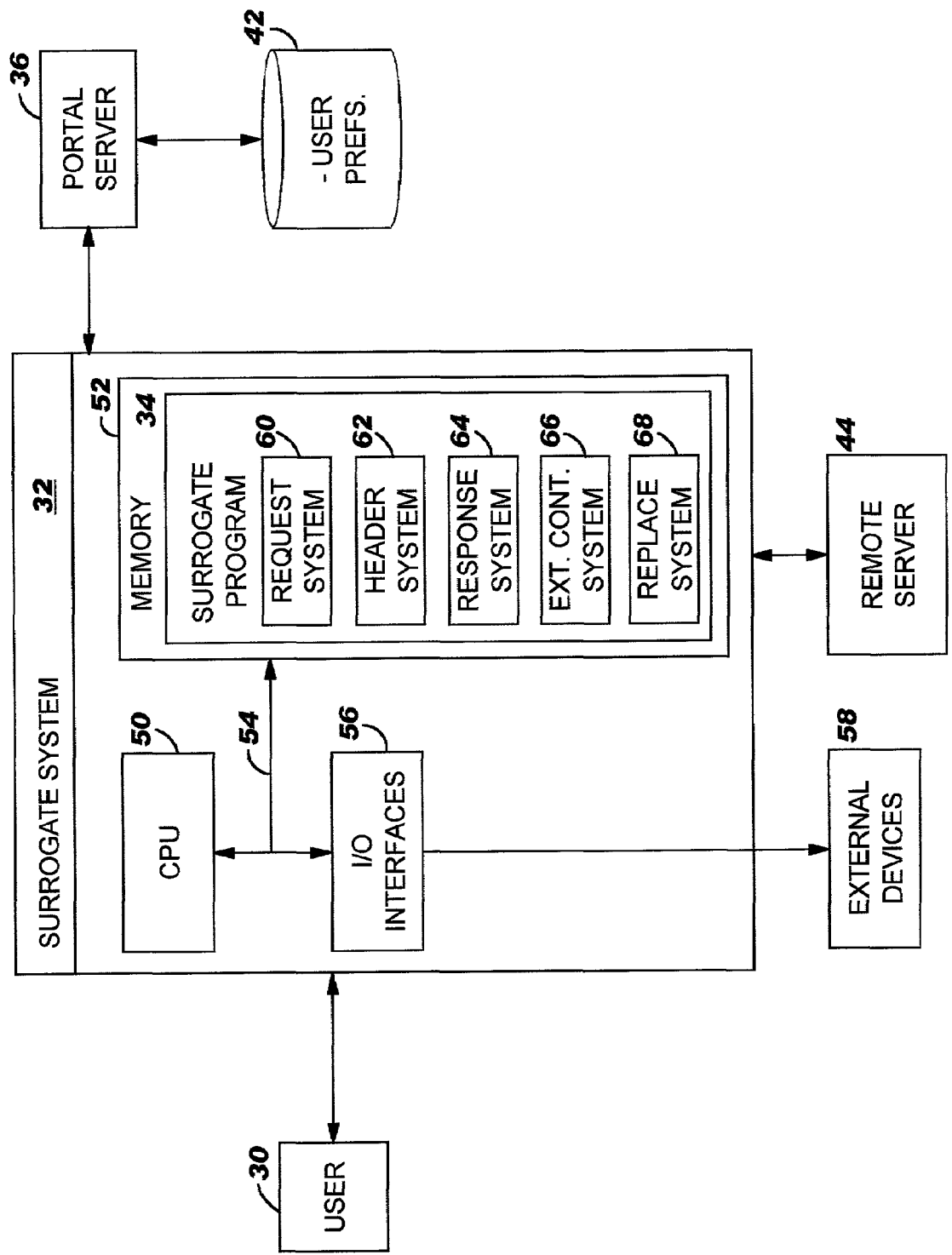
FIG. 3 depicts a more detailed diagram of the surrogate system of FIG. 2.

Referring now to FIG. 3, a more detailed diagram of surrogate system 32 is shown. As depicted, surrogate system 32 generally includes central processing unit (CPU) 50, memory 52, bus 54, input/output (I/O) interfaces 56 and external devices/resources 58. CPU 50 may comprise a single processing unit, or be distributed across one or more processing units in one or more locations, e.g., on a client and server. Memory 52 may comprise any known type of data storage and/or transmission media, including magnetic media, optical media, random access memory (RAM), read-only memory (ROM), a data cache, a data object, etc. Moreover, similar to CPU 50, memory 52 may reside at a single physical location, comprising one or more types of data storage, or be distributed across a plurality of physical systems in various forms.

I/O interfaces 56 may comprise any system for exchanging information to/from an external source. External devices/resources 58 may comprise any known type of external device, including speakers, a CRT, LED screen, hand-held device, keyboard, mouse, voice recognition system, speech output system, printer, monitor, facsimile, pager, etc. Bus 54 provides a communication link between each of the components in surrogate system 32 and likewise may comprise any known type of transmission link, including electrical, optical, wireless, etc. In addition, although not shown, additional components, such as cache memory, communication systems, system software, etc., may be incorporated into surrogate system 32.

It should be understood surrogate system 32, portal system 36 and remote system 44 are intended to be representative of any type of computerized system. Examples include a server, a client, a workstation, a laptop, a personal digital assistant, etc. In addition, it is understood that communication between surrogate system 32, portal system 36 and remote system 44 can occur via a direct hardwired connection (e.g., serial port), or via an addressable connection (e.g., the Internet, a LAN, a WAN, a VPN, or other network). It should also be appreciated that although not shown, portal system 36 and remote system 44 typically include computer components (e.g., CPU, memory, etc.) similar to surrogate system 32. Such components have not been shown for brevity purposes only.

Stored in memory 52 of surrogate system 32 is surrogate program 34. As shown, surrogate program 34 includes request system 60, header system 62, response system 64, external content system 66 and replacement system 68. Under the present invention, a request for portal content is received from user 30 by request system 60. Upon receipt, header system 62 will optionally attach a header to the request that alerts portal system 36 as to the presence of surrogate system 32 as well as its capabilities (e.g., that surrogate system 32 will retrieve and aggregate a particular type (e.g., external) of portal content). Once the header has been attached, request system 60 will forward the request to portal system 36. As indicated above, portlets within portal system 36 (or on other servers not shown) will generate a first type of portal content (e.g., internal). Once generated, the first type of portal content will be aggregated and packaged into a response. Portal system 36 will also insert place holders in the response. The place holders correspond to the second type of portal content (e.g., external) that surrogate system 32 is responsible for obtaining and aggregating.

Once assembled, the response is then transmitted to surrogate system 32 and received by response system 64. Upon receipt, one or more proxies within external content system 66 will invoke any applicable remote portlets on remote system 44 (e.g., content provider) to generate and retrieve the missing second type of portal content. If the first type of portal content was "internal" portal content retrieved, the second type is "external" portal content that is retrieved from remote or external content source(s). Once retrieved, replacement system 68 will aggregate the response. That is, replacement system 68 will replace the place holders in the response received from portal system 36 with the second type of portal content. Then, response system 64 will transmit the finalized response to user 30 for display/rendering as a portal page. As indicated above, the portal content will be rendered according to any user preferences as stored in log 42.

It should be understood that log 42 could be any system for storing content such as a database. In such a case, log 42 may include one or more storage devices, such as a magnetic disk drive or an optical disk drive. In another embodiment, log 42 includes data distributed across, for example, a local area network (LAN), wide area network (WAN) or a storage area network (SAN) (not shown). Log 42 may also be configured in such a way that one of ordinary skill in the art may interpret it to include one or more storage devices.

Figure 4:
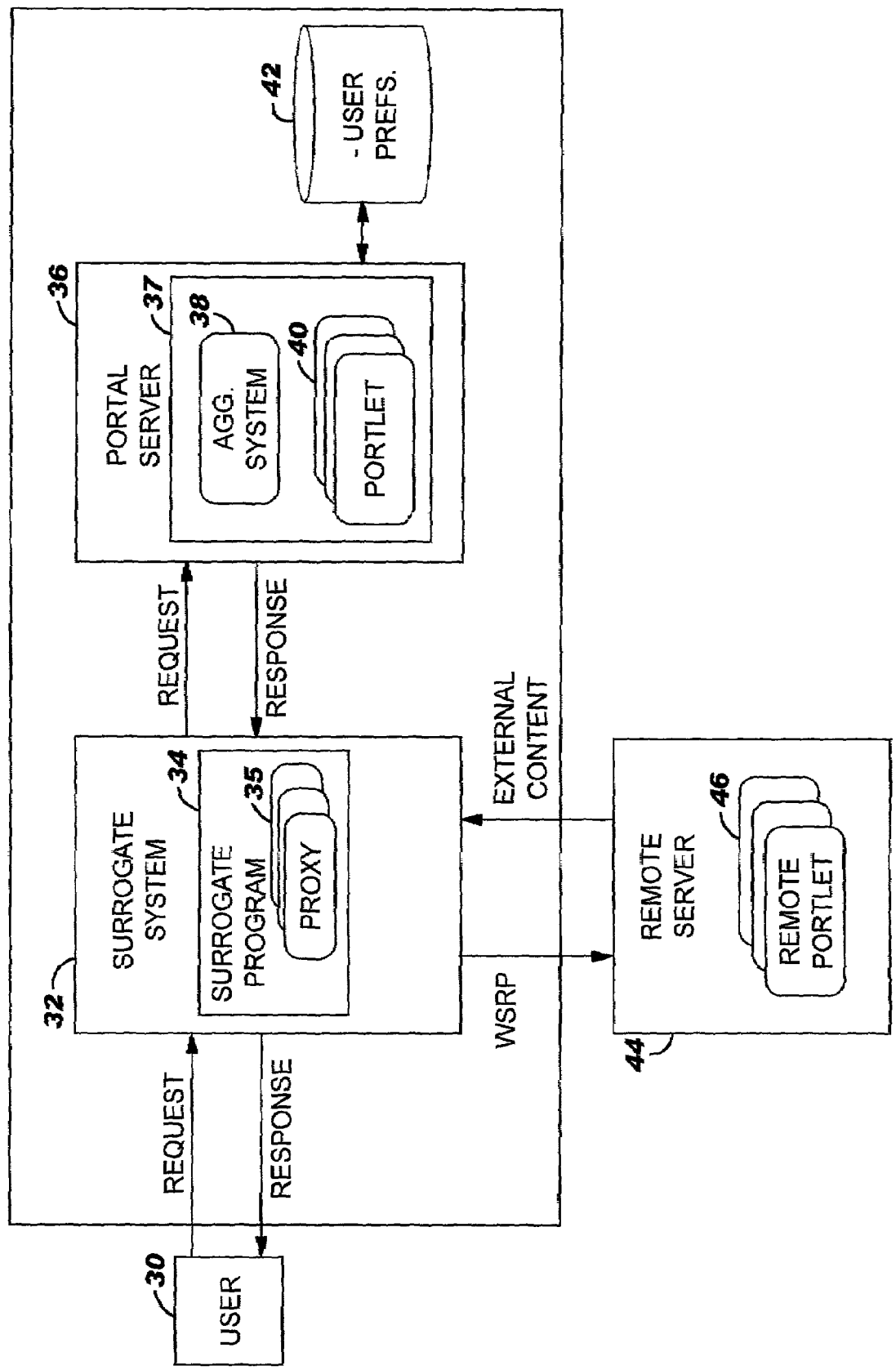
FIG. 4 depicts the surrogate system and portal system of FIG. 2 existing in a common network.

It should also be understood that surrogate system 32 could exist within or outside of the same network as portal system 36. For example, as shown in FIG. 4, surrogate system 32 and portal system 36 reside within a common network. Such an embodiment will not prevent the obtaining and aggregation of portal content to be distributed. For example, surrogate system 32 could still obtain and aggregate external portal content, while portal system 36 obtains and aggregates internal portal content. In either event, it should be appreciated that surrogate system 32 could be included as part of a common network, or sold as a "service" by a third party broker/provider. In this case, the third party broker would typically establish and maintain any relationships with the necessary content providers (e.g., remote systems, etc.). For example, if a website owner wished to make outside portal content (e.g., Weather, A.P. News, ESPN Sports, etc.) available to user 30, the third party broker would contract the content providers and provide a surrogate system(s) 32 that is capable of obtaining the desired portal content. The cost of maintaining these relationships could be factored into the broker's price to the website owner. When surrogate system(s) 32 are provided by a third party broker, numerous advantages are presented. For example, the website owner purchasing the surrogate system service is relieved of having to "contract" with individual content providers to obtain the second type (e.g., outside) of portal content. Rather, the website owner could simply inform the broker of the type of content (e.g., Weather, A.P. News, ESPN Sports, etc.) they wish to provide, and leave the burden of making the portal content obtainable on the broker. Moreover, the website owner would be relieved of the overhead involved with maintaining the surrogate system(s) 32. Still yet, the broker would be provided with a revenue stream that is variable based upon, for example, the type, amount and/or nature of content that must be provided.

It should be understood that although only one surrogate system and remote system have been depicted herein, the teachings of the present invention could be implemented using multiple surrogate systems and/or remote systems that operate in series on the response received from the portal system. For example, an end user in a branch office might request the company's portal page, which might include corporate and branch-office content as well as external content. In this case the request might flow through a branch "surrogate," then through an Internet-based "surrogate," and finally to the portal system within the corporate data center. The response might also contain two types of place holders (e.g., those targeted at the Internet-based surrogate, and those targeted at the branch surrogate).

Figure 5:
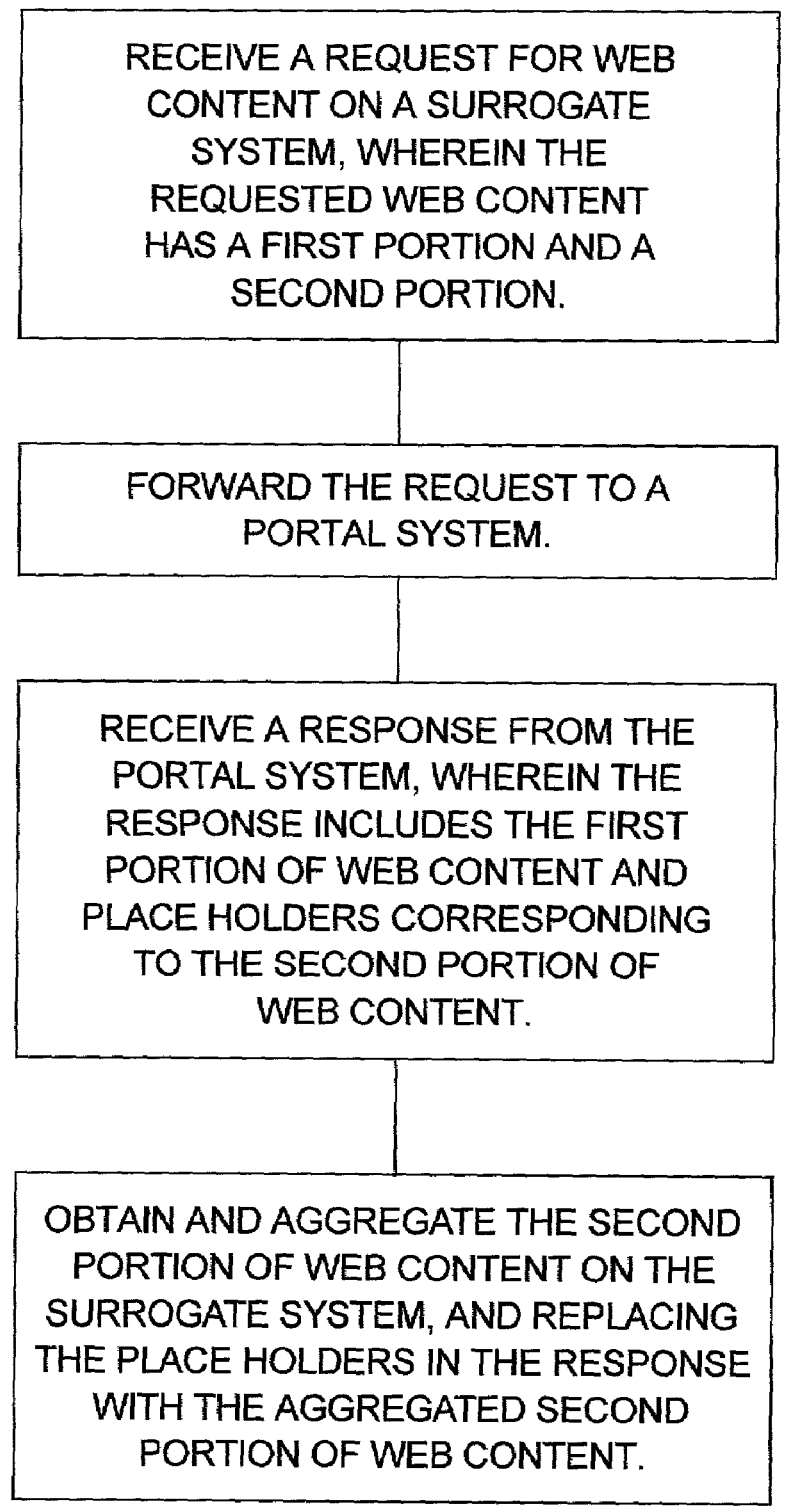
FIG. 5 depicts a method flow diagram, according to the present invention.

Referring now to FIG. 5, a method flow diagram 100 is shown. First step 102 is to receive a request for portal content on a surrogate system, wherein the requested portal content has a first type and a second type. Second step 104 is to forward the request to a portal system. Third step 106 is to receive a response from the portal system, wherein the response includes the first type of portal content and place holders corresponding to the second type of portal content. Fourth step 108 is to obtain the second type of portal content on the surrogate system, and replace the place holders in the response with the second type of portal content.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls surrogate system 32 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for distributing portal content processing, comprising:
   receiving a request for portal content on a surrogate system, wherein the requested portal content has a first type and a second type;
   forwarding the request from the surrogate system to a portal system;
   receiving a response at the surrogate system from the portal system, wherein the response includes the first type of portal content and place holders corresponding to the second type of portal content;
   obtaining the second type of portal content on the surrogate system, and replacing the place holders in the response with the second type of portal content to combine the first type of portal content that is obtained and aggregated on the portal system with the second type of portal content that is obtained on the surrogate system, wherein the combination is performed on the surrogate system; and
   providing the combination to a reguestor of the portal content.

2. The method of claim 1, further comprising rendering the response as a portal page.

3. The method of claim 1, further comprising adding a header to the request on the surrogate system, prior to forwarding the request to the portal system.

4. The method of claim 1, further comprising:
   providing place holders corresponding to the second type of portal content; and
   transmitting the aggregated first type of portal content and the place holders to the surrogate system as a response.

5. The method of claim 1, wherein the obtaining and aggregating comprises generating the first type of portal content via a portlet.

6. The method of claim 1, wherein the obtaining step comprises invoking a remote portlet to generate the second type of portal content.

7. The method of claim 6, wherein the remote portlet is loaded on a remote system, and wherein the second type of portal content is forwarded to the surrogate system from the remote portlet.

8. The method of claim 6, wherein the place holders comprise information necessary to invoke the remote portlet.

9. The method of claim 6, wherein the invoking step comprises transmitting a web services for remote portals (WSRP) request to the remote portlet based on the place holders.

10. The method of claim 1, wherein the surrogate system is provided by a third party broker, and wherein the obtaining step comprises obtaining the second type of content on the surrogate system from a content provider.

11. The method of claim 10, wherein the content provider is contracted by the third party broker.

12. A method for distributing portal content processing, comprising:
    receiving a request for a first type of portal content and a second type of portal content on a surrogate system, and forwarding the request to a portal system;
    obtaining and aggregating the first type of portal content and providing place holders corresponding to the second type of portal content, on the portal system;
    transmitting a response containing the aggregated first type of portal content and the place holders from the portal system to the surrogate system;
    obtaining the second type of portal content on the surrogate system, and replacing the place holders in the response with the second type of portal content to combine the first type of portal content that is obtained and aggregated on the portal system with the second type of portal content that is obtained on the surrogate system, wherein the combination is performed on the surrogate systenr; and
    providing the combination to a reguestor of the portal content.

13. The method of claim 12, further comprising rendering the response as a portal page.

14. The method of claim 12, further comprising adding a header to the request on the surrogate system prior to forwarding the request to the portal system.

15. The method of claim 12, wherein obtaining and aggregating the first type of portal content comprises generating the first type of portal content via a portlet.

16. The method of claim 12, wherein the step of obtaining the second type of portal content comprises invoking a remote portlet to generate the second type of portal content.

17. The method of claim 16, wherein the remote portlet is loaded on a remote system, and wherein the generated second type of portal content is forwarded to the surrogate system from the remote portlet.

18. The method of claim 16, wherein the invoking step comprises transmitting a web services for remote portals (WSRLP) request to the remote portlet based on the place holders.

19. A system for distributing portal content processing, comprising:
    a request system for receiving a request for a first type of portal content and a second type of portal content on a surrogate system, and for forwarding the request to a portal system;
    a response system for receiving a response containing the first type of portal content and place holders corresponding to the second type of portal content, from the portal system;
    an external content system on the surrogate system for obtaining the second type of portal content;
    a replacement system for replacing the place holders in the response with the second type of portal content to combine the first type of portal content that is obtained and aggregated on the portal system with the second type of portal content that is obtained on the external system, wherein the combination is performed on the surrogate system; and
    a response system for providing the combination to a requestor of the portal content.

20. The system of claim 19, further comprising a header system for adding a header to the request, prior to forwarding the request to the portal system.

21. The system of claim 19, wherein the portal provides place holders corresponding to the second type of portal content, and transmits the aggregated first type of portal content and the place holders to a surrogate system as the response.

22. The system of claim 19, wherein the portal system obtains the first type of portal content by invoking a portlet.

23. The system of claim 19, further comprising a rendering system for rendering the response as a portal page, after the place holders have been replaced.

24. The system of claim 19, wherein the external content system invokes a remote portlet by transmitting a web services for remote portlets (WSRP) request to the remote portlet, and wherein the remote portlet generates the second type of portal content based on the WSRP request.

25. A system for distributing portal content processing, comprising:
   a surrogate system for receiving a request for portal content, wherein the requested portal content includes a first type and a second type;
   a portal system for receiving the request from the surrogate system, wherein the portal system obtains and aggregates the first type of portal content and provides place holders corresponding to the second type of portal content, and wherein the portal system transmits the aggregated first type of portal content and the place holders to the surrogate system as a response;
   wherein the surrogate system obtains The second type of portal content, and replaces the place holders with The second type of portal content to combine the first type of portal content that is obtained and aggregated on the portal system with the second type of portal content that is obtained on the surrogate system, and wherein the combination is performed on the surrogate system; and
   wherein the surrogate system provides the combination to a requestor of the portal content.

26. The system of claim 25, wherein the surrogate system further renders the response as a portal page, after the place holders have been replaced.

27. The system of claim 25, wherein the portal system obtains the first type of portal content by invoking a portlet.

28. The system of claim 25, wherein the surrogate system obtains the second type of portal content by invoking a remote portlet.

29. The system of claim 28, wherein the remote portlet is invoked by transmitting a web services for remote portlets (WSRP) request from the surrogate system to a remote portlet based on the place holders.

30. The system of claim 25, wherein the surrogate system and the portal system are part of a common network.

31. The system of claim 25, wherein the surrogate system is provided by a third party broker.

32. A program product stored on a recordable medium for distributing portal content processing, which when executed, comprises:
   program code for receiving a request for a first type of portal content and a second type of portal content on a surrogate system, and for forwarding the request to a portal system;
   program code for receiving a response containing the first type of portal content and place holders corresponding to the second type of portal content from the portal system;
   program code for obtaining the second type of portal content on the surrogate system;
   program code for replacing the place holders in the response with the second type of portal content to combine the first type of portal content that is obtained and aggregated on the portal system with the second type of portal content that is obtained on the surrogate system, wherein The combination is performed on the surrogate system; and
   program code for providing the combination to a requestor of the portal content.

33. The program product of claim 32, further comprising a program code for adding a header to the request, prior to forwarding the request to the portal system.

34. The program product of claim 32, further comprising:
   program code for providing place holders corresponding to the requested second type of portal content; and
   program code for transmitting the response containing the aggregated first type of portal content and the place holders to the program code for receiving a response.

35. The program product of claim 32, wherein the program code for obtaining and aggregating invokes a portlet to obtain the first type of portal content.

36. The program product of claim 32, wherein the program code for obtaining invokes the remote portlet by transmitting a web services for remote portlets (WSRP) request to the remote portlet based on the place holders, and wherein the remote portlet provides the second type content based on the WSRP request.

37. The program product of claim 32, further comprising program code for rendering the response as a portal page, after the place holder have been replaced.

* * * * *